United States Patent [19]

Shibazaki

[11] Patent Number: 5,415,218
[45] Date of Patent: May 16, 1995

[54] DEVICE FOR REMOVING TIRE FROM WHEEL

[76] Inventor: Shinichiro Shibazaki, 204, Oaza Sakai, Hukaya-shi, Saitama-ken, Japan

[21] Appl. No.: 147,581
[22] Filed: Nov. 5, 1993

[30] Foreign Application Priority Data

Dec. 2, 1992 [JP] Japan .................. 4-349851

[51] Int. Cl.⁶ .......................... B60C 25/132
[52] U.S. Cl. .................... 157/1.2; 157/1.17
[58] Field of Search ............ 157/1, 1.1, 1.17, 1.2, 157/1.28

[56] References Cited

U.S. PATENT DOCUMENTS 4,355,674 10/1982 Grasso ........................ 157/1.2
4,945,968 8/1990 Bradburn ..................... 157/1.1 X

FOREIGN PATENT DOCUMENTS

161045 2/1955 Australia ..................... 157/1.2

Primary Examiner—James G. Smith
Attorney, Agent, or Firm—Lowe, Price, LeBlanc & Becker

[57] ABSTRACT

A device for removing a rubber tire from a metal wheel is capable of efficiently removing the tire from the wheel without damaging the tire. The device includes a working table for positioning the wheel fitted with the tire, and a press mechanism arranged above the working table for vertical movement relative to the working table. The press mechanism has a press disc having a sectionally truncated conical tapered hole with a plurality of rim depressing projections extending in an axial direction and arranged at given intervals in the circumferential direction on the inner periphery thereof, and means for vertically moving the press disc.

10 Claims, 6 Drawing Sheets

DEVICE FOR REMOVING TIRE FROM WHEEL

BACKGROUND OF THE INVENTION

1. Field of the Invention

The present invention relates to a device for removing a rubber tire from a spoke type wheel, a dish type wheel or the like.

2. Description of the Related Art

Due to recent remarkable improvement in quality, life (duration) of tires, such as used in automotive vehicles or the like, has been significantly expanded. Many of the tires equipped on second-hand cars to be scrapped are still useful as second-hand tires.

On the other hand, for such second-hand tires, there is a high demand in certain countries, such as,. Southwest Asian countries, experiencing a shortage of the same. A large number of the second-hand tires are exported from Japan.

Upon shipping for exportation, it is typical to remove the tires from wheels and to ship bare tires since metal wheels, on which the tires are fitted, may cause substantial increase of weight and thus cause substantial increase of transportation cost.

Conventionally, the tire has been removed from the wheel by means of a tire lever or by way of so-called "bead drop".

Figure 8:
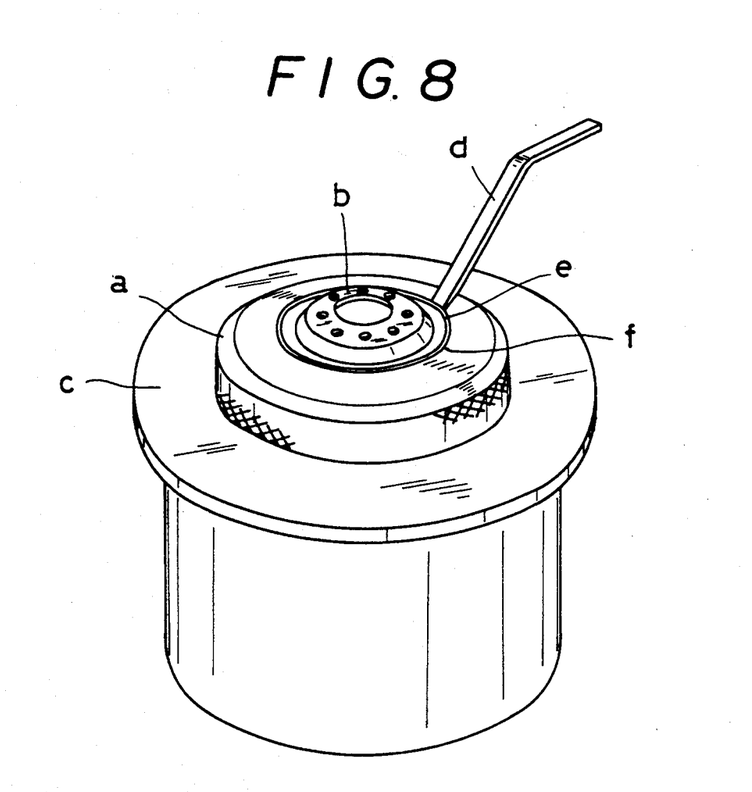
FIG. 8 is a perspective view showing a condition during a tire removing operation by means of a lever in the prior art.

In case of removal of the tire from the wheel by means of the tire lever, as shown in FIG. 8, a wheel b with a tire a is placed on a working table c. Then, the tip end of a lever d is inserted between the rim e of the wheel and the bead portion f of the tire. At this condition, the bead portion f is released from the edge of the rim e utilizing a lever action while rotating the wheel b.

On the other hand, in case of the bead drop (not shown), in a drop center type wheel having no rings, such as that for passenger vehicle, after discharging the air in the tire, the bead portion f of the tire a is stepped on a human foot or hit by a hammer (not shown) to loosen engagement with the rim e. Subsequently, the bead portion f is gouged by two tire levers (not shown) and is thus released from the edge of the rim e to remove the tire from the wheel.

However, when the tire is removed from the wheel by means of the lever or by way of the bead drop, gouging of the bead portion f of the tire a by inserting the lever d between the bead portion f and the rim e of the wheel, often damages the tire, particularly the bead portion f, thus degrading the value of the tire as an article of commerce. Further, and even worse, the tire is frequently damaged critically so that it cannot again be used as a tire. In addition, due to complete manual operation, removal of the tire from the wheel has been labor and time intensive and inefficient in application of labor, thus resulting in significant increase of the production cost.

SUMMARY OF THE INVENTION

With the above-mentioned problems in mind, it is an object of the present invention to provide a device for removing a tire from a wheel, which can efficiently remove the tire from the wheel without damaging the tire.

In order to accomplish the above-mentioned object, according to one aspect of the present invention, a device for removing a tire from a wheel comprises:

a working table for positioning the wheel fitted with the tire; and a press mechanism arranged above the working table for vertical movement relative to the working table, and including a press disc having a sectionally truncated conical tapered hole with a plurality of rim depressing projections extending in axial direction and arranged with a given interval in the circumferential direction on the inner periphery thereof, and means for vertically moving the press disc.

In order to accomplish the above-mentioned object, according to a second aspect of the invention, a device for removing a tire from a wheel comprises:

a working table for positioning the wheel fitted with the tire;

a press mechanism arranged above the working table for vertical movement relative to the working table, and including a press disc having a sectionally truncated conical tapered hole with a plurality of rim depressing projections extending in axial direction and arranged with a given interval in the circumferential direction on the inner periphery thereof, and means for vertically moving the press disc; and a wheel pushing out mechanism arranged about the working table and passing through a center portion of the tapered hole of the press disc for vertical movement.

In order to accomplish the above-mentioned and other object, according to a third aspect of the invention, a device for removing a tire from a wheel comprises:

a working table for positioning the wheel fitted with the tire, the working table being formed with a circular wheel dropping hole having a diameter slightly greater than the diameter of the wheel fitted with the tire;

a press mechanism arranged above the working table for vertical movement relative to the working table, and including a press disc having a sectionally truncated conical tapered hole with a plurality of rim depressing projections extending in axial direction and arranged with a given interval in the circumferential direction on the inner periphery thereof, and means for vertically moving the press disc;

a wheel pushing out mechanism arranged about the working table and passing through a center portion of the tapered hole of the press disc for vertical movement; and a wheel receptacle arranged below the circular wheel dropping hole and tiltable for descending rearwardly.

In the practical tire removing operation, by removing an air cap, air in the tire is discharged. Then, by applying water, soapy water, oil or the like the tire is lubricated for avoiding injury thereof.

Then, the wheel with the tire is placed on the working table with substantial alignment of the wheel with the circular wheel dropping hole.

Subsequently, the wheel receptacle is placed below the working table in a horizontal position. In conjunction therewith, a wheel positioning projection is projected through a center hole of the working table to engage with the center hole of the wheel for positioning the wheel at the predetermined working position.

Then, the press mechanism is lowered to engage the rim of the wheel with the inner periphery of the tapered hole of the press disc. During this operation, only an upper side rim 3a of the wheel 3 is partially bent inwardly by the depressing projections 12... At the same time, the tire is compressed by the lower surface of the circumferential edge of the press disc to be deformed into a slightly flat configuration. Therefore, the one side (upper side) bead portion of the tire is released from one side (upper side) rim of the wheel.

Subsequently, the wheel pushing mechanism is lowered through the press disc to push the wheel downwardly. By this operation, the wheel is dropped below the working table through the wheel dropping hole away from the tire. Then, the wheel is received by the wheel receptacle. Here, in conjunction with pushing out of the wheel by the pushing out mechanism, the wheel receptacle is displaced to the rearwardly descended position so that the wheel may slip on the upper surface of the wheel receptacle to be ejected toward read portion of the working table.

Thus, only the tire is left on the working table.

A cylindrical pushing member may be fixed to the lower end of the pushing mechanism. The cylindrical pushing member may have the front portion of the lower end, on which an inclined surface is formed extending from front upper portion to rear lower portion. By this configuration, the rear side corresponding to an inclining direction of a wheel receptacle is depressed by the rear side lower surface of the pushing member so that the wheel can be released from the tire from the rear side.

Next, by lifting the pushing out mechanism and the press mechanism, the tire is removed from the working table.

On the other hand, the wheel receptacle is returned to the horizontal position for positioning of the wheel with the tire on the working table.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention but are provided for purposes of explanation and understanding only.

In the drawings.

DESCRIPTION OF THE PREFERRED EMBODIMENT

The preferred embodiments of the present invention will be discussed hereinafter with reference to the accompanying drawings.

Figure 1:
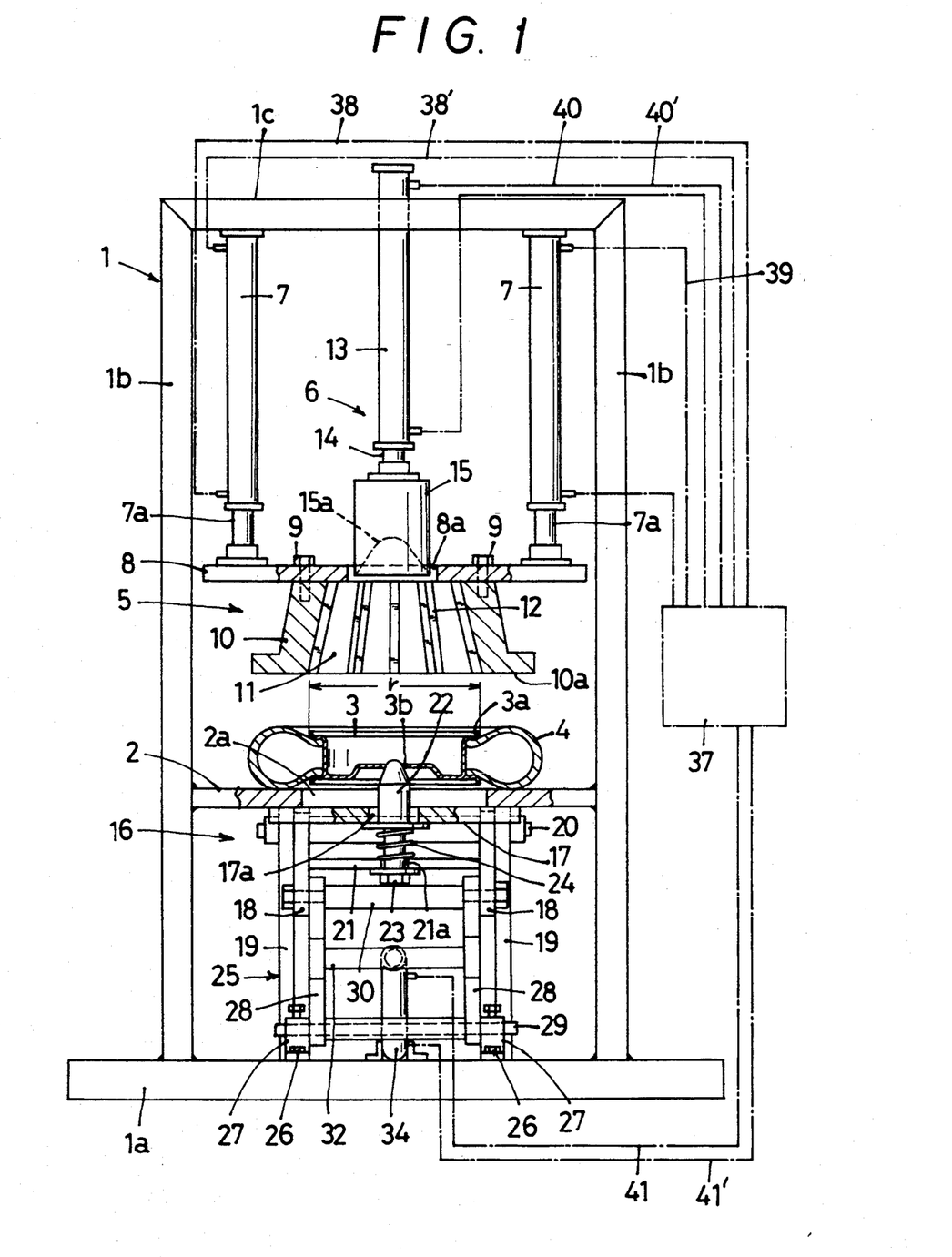
FIG. 1 is a partially sectioned back elevation of an embodiment of a device for removing tire from a wheel, according to the present invention.
Figure 2:
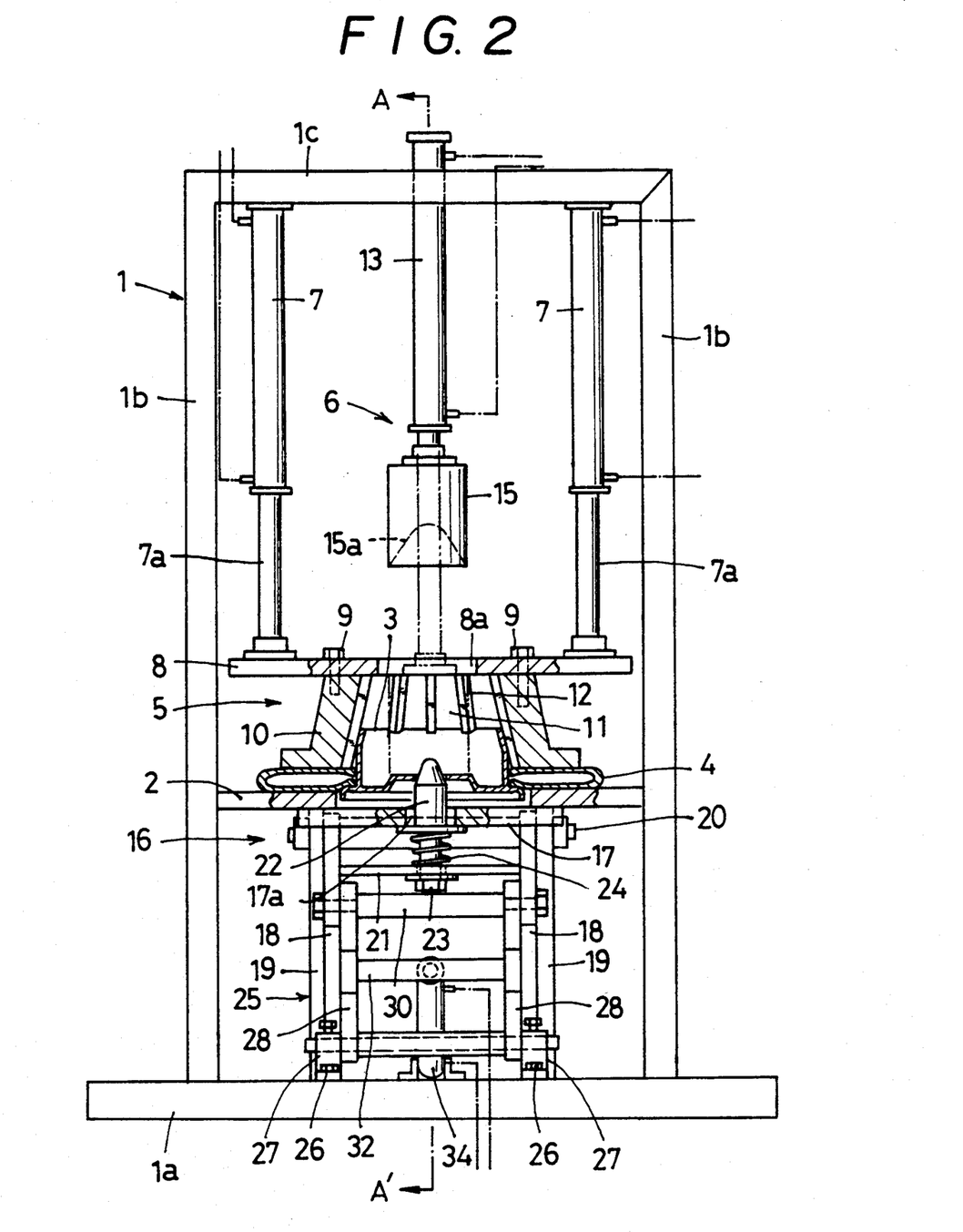
FIG. 2 is a similar partially section back elevation of the embodiment, but showing a condition in use.
Figure 3:
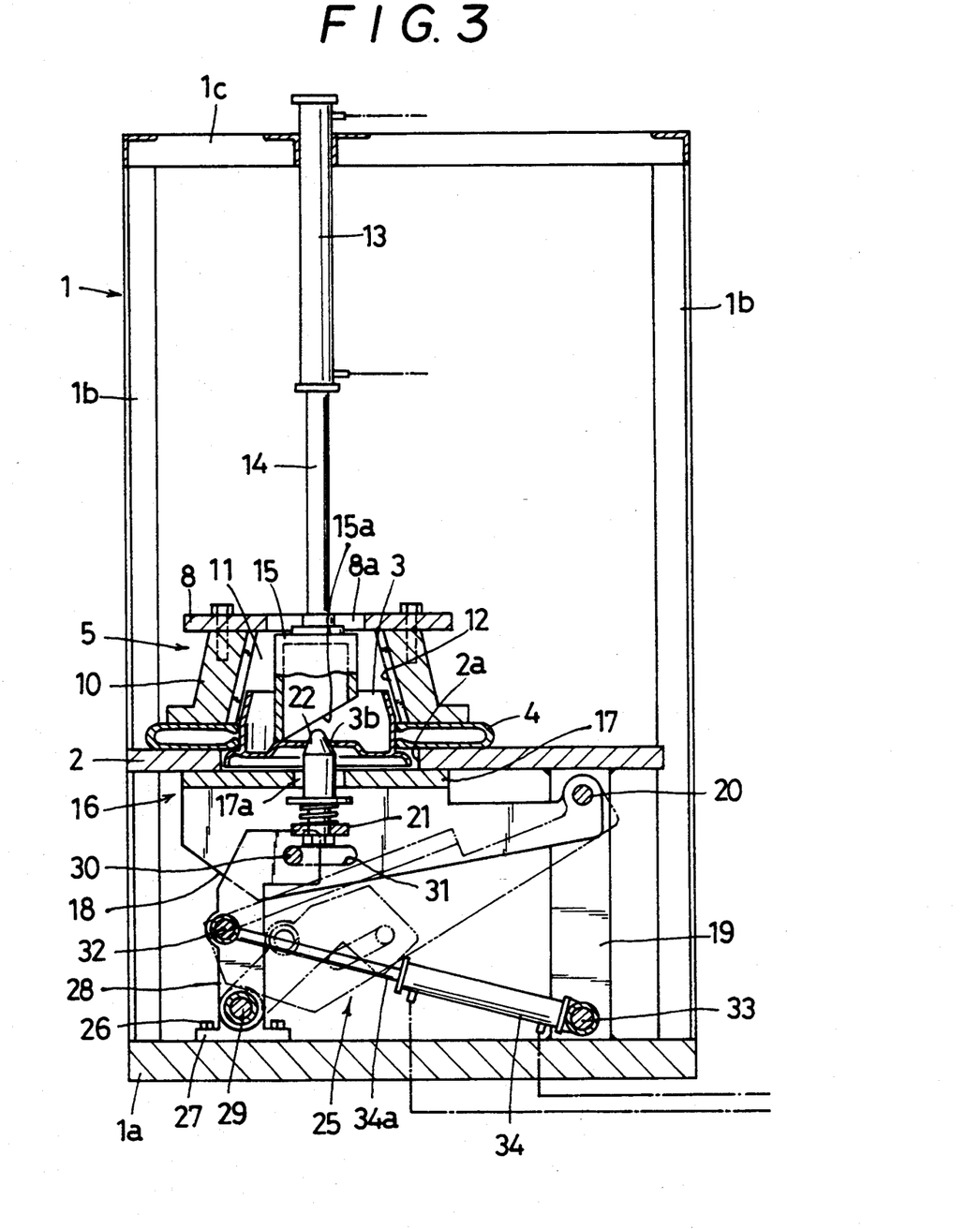
FIG. 3 is a longitudinally section side view taken along line A-A' of FIG. 2.
Figure 4:
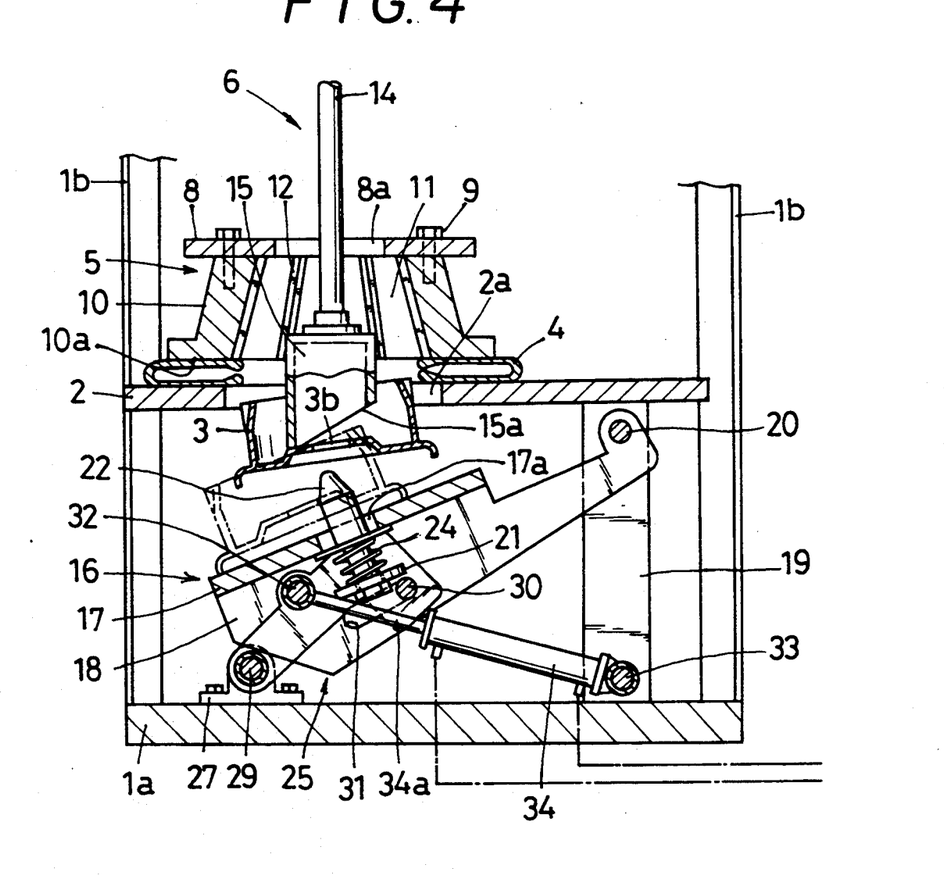
FIG. 4 is a partially removed longitudinally sectioned side elevation of the embodiment, in which is illustrated a condition for pushing out the wheel.

Referring now to FIGS. 1~4, FIG. 1 is a partially sectioned back elevation of an embodiment of a device for removing a tire from a wheel, according to the present invention; FIG. 2 is a similar partially sectional back elevation of the embodiment, but showing a condition in use; FIG. 3 is a longitudinal section side view taken along line A-A' of FIG. 2; and FIG. 4 is a partially removed longitudinally sectioned side elevation of the embodiment, in which is illustrated a condition for pushing out the wheel.

As shown FIGS. 1~3, a framework 1 is formed with a bottom plate 1a, a plurality of main beams 1b..., such as angles, vertically extending from four corners of the upper surface of the bottom plate 1a, and a plurality of transverse beams 1c..., such as angles, connecting upper ends of the main beams 1b... The framework 1 is thus formed into a vertically elongated configuration.

In the framework 1, a wooden working table 2 is horizontally secured at a height convenient for mounting a wheel 3 with a tire 4 and for removing the tire 4 from the wheel.

At the back side of the working table 2 (left side in FIGS. 3 and 4), a wheel dropping circular hole 2a having an internal diameter greater than the external diameter r of the wheel 3 in a given magnitude, is formed through in vertical direction.

In the above-mentioned framework 1, a press mechanism 5 and a wheel pushing out mechanism 6 are arranged for vertical movement.

The press mechanism 5 comprises a pair of cylinders 7, 7 vertically fixed to the framework 1 and positioned in laterally spaced apart relationship in a given distance, a supporting plate 8 having a circular hole 8a at the center and fixed to the lower ends of reciprocating rods 7a, 7a of the cylinders 7, 7, and a press disc 10 of substantially cylindrical configuration and fixed to the lower surface of the support plate 8 by means of a plurality of bolts 9...

As shown in FIGS. 1~4 and 6, the press disc 10 is formed with a truncated conical tapered hole 11 at the center. On the inner periphery of the tapered hole 11, a plurality of (eight in the shown case) rim depressing projections 12... extend in an axial direction at regular intervals in the circumferential direction.

Figure 7:
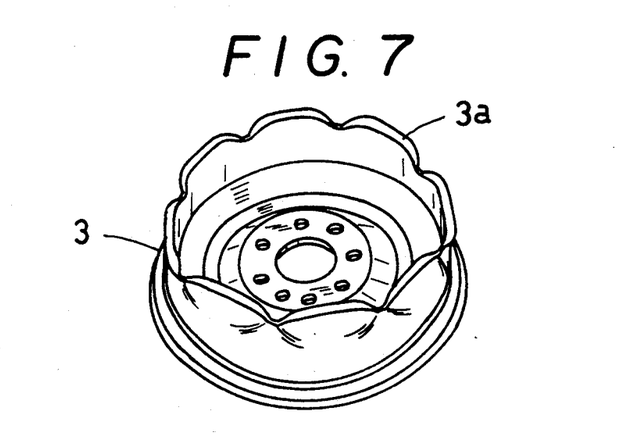
FIG. 7 is a perspective view of the wheel in a condition where the tire is removed by the embodiment.

The internal diameter R at the lower end of the tapered hole 11 is selected to be slightly greater than the external diameter r of the wheel 3 so that the rim 3a of the wheel may engage therewith. On the other hand, the internal diameter R' at the upper end is selected to be smaller than the external diameter r of the wheel 3 in an appropriate magnitude. By this, when the press disc 10 is lowered, only upper side rim 3a of the wheel 3 is initially bent inwardly by the depressing projections 12... in part, and subsequently the remaining portion of the rim 3a is bent inwardly by the inner periphery of the tapered hole 11 so that the rim 3a can be bent into rounded configuration without forming any edge as shown in FIG. 7.

On the other hand, the press disc 10 is provided a flat and smooth lower surface 10a of the circumferential wall so that it may depress the tire 4 without injuring the latter.

The pushing out mechanism 6 comprises a cylinder 13 vertically fixed on the framework 1 and a reciprocating rod 14 as an output shaft. By downwardly extending the reciprocating rod 14 through the center hole 8a of the support plate 8 and through the center of the tapered hole 11 of the press disc 10, the wheel 3, released from the tire 4, is pushed downwardly.

In the shown embodiment, a cylindrical pushing member 15 is fixed to the lower end of the reciprocating rod 14. The cylindrical pushing member 15 has the lower end, on which an inclined surface 15a extending from front upper portion to rear lower portion is formed as clearly shown in FIGS. 3 and 4. By this, one side of the wheel 3, namely the rear side (left side in FIGS. 3 and 4) corresponding to an inclining direction of a wheel receptacle 16 which will be discussed later, is depressed by the rear side lower surface 15b of the pushing member 15, so that the wheel 3 can be released from the tire 4 from one side, as shown in FIG. 4.

As shown in FIGS. 1~4, the wheel receptacle 16 is arranged below the circular hole 2a of the working table 2 for dropping the wheel.

The wheel receptacle 16 comprises a disc shaped receptacle plate 17 having greater diameter than the circular hole 2a of the working table 2, and left and right side plates 18, 18 positioned at left and right side portions on the back side of the receptacle plate 17 and fixed in parallel relationship in orientation to be elongated in back and forth direction. Frontwardly (rightward in FIGS. 3 and 4) extended ends of both side plates 18, 18 are pivoted to support plates 19, 19 via support shaft 20, which support plates are vertically fixed at the front portion of bottom plate 1a of the framework 1 and the working table 2. Therefore, the side plates 18, 18 are pivotable between a horizontal position and a rearwardly (leftward in FIG. 3) descending position, as shown by the solid line and the two dotted line in FIG. 3 about the support shaft 20.

On the other hand, the wheel receptacle plate 17 has a positioning projection 22 for the wheel 3, which wheel positioning projection is supported by a supporting bar extending between the left and right side plates 18, 18. The wheel positioning projection 22 extends through the center hole 17a of the receptacle plate 17.

The wheel positioning projection 22 is adapted to be inserted into the central hole 3b of the wheel 3 so that the wheel 3 with the tire 4 can be positioned in alignment with the wheel dropping circular hole 2a of the working table 2, as shown in FIG. 1. In addition, the positioning projection 22 is slidably inserted into a through opening 21a of the support bar 21, prevented from loosening out by a nut 23, and is biased by a compression spring 24 disposed between the support bar 21 and the projection 22 so as to absorb an impact upon bending of the rim 3a of the wheel by the press mechanism 5 and upon downwardly pushing out of the wheel 3 by the wheel pushing out mechanism 6.

The wheel receptacle 16 is driven between the inclined position and the horizontal position by a drive mechanism 25.

The drive mechanism 25 may be constructed as follows.

As shown in FIGS. 1~4, rear ends of left and right swing plates 28 and 28 are pivoted for pivotal motion in back and forth direction (left and right direction in FIGS. 3 and 4) about a support shaft 19 held by left and right bearings 27, 27 fixed to the upper surface of the rear portion of the bottom plate 1a of the framework 1 by means of bolts 26, 26 in laterally spaced apart relationship. The upper ends of the swing plates 28, 28 and left and right side plates 18, 18 of the wheel receptacle 16 are slidably coupled via support shaft 30 and elongated holes 31. A support shaft 32 extending between vertically intermediate positions of both swing plates 28, 28 is pivotally connected to an output shaft 34a of a cylinder 34 which is pivoted to the lower portion of the left and right support plates 19, 19 via support shaft 33 at one end. Thus, by extending and contracting motion of the output shaft 34a, the swing plates 28, 28 are swung in a back and forth direction to thereby pivot the wheel receptacle 16 in a vertical direction about the support shaft 20. Therefore, the wheel receptacle 16 can be pivoted between a horizontal position and a rearwardly descending position, as shown by the solid line and the two dotted line in FIG. 3 about the support shaft 20.

Figure 5:
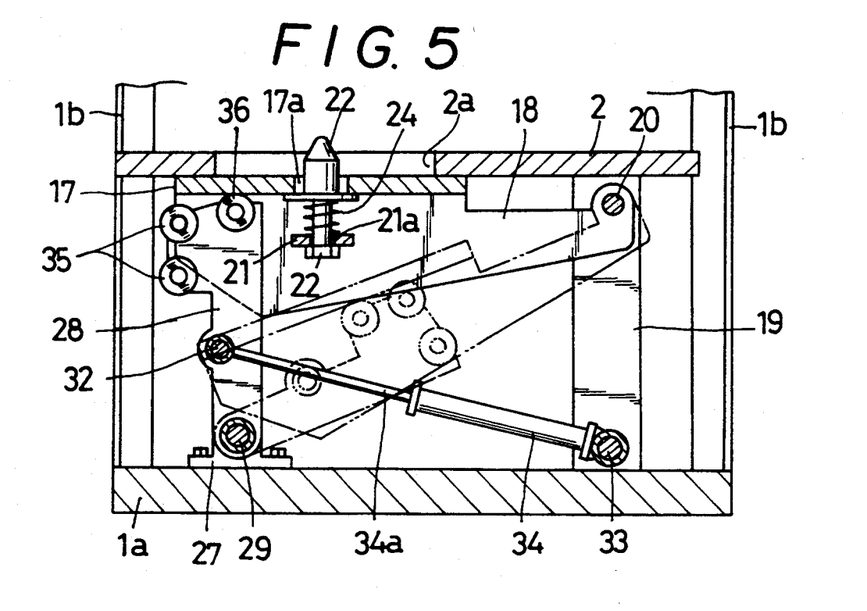
FIG. 5 is a longitudinal section side elevation of another embodiment of a wheel receptacle drive mechanism in the device according to the present invention.
Figure 6:
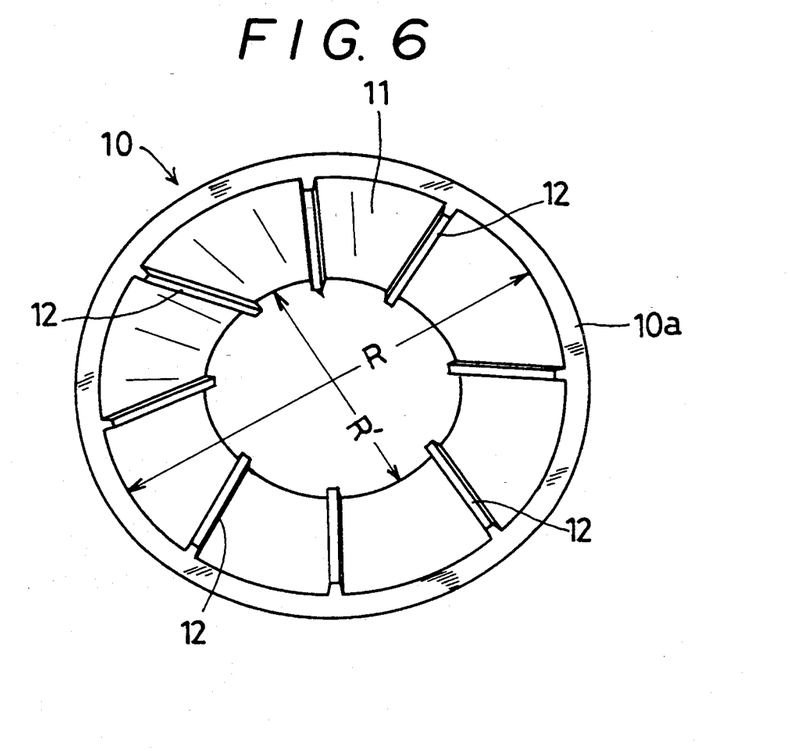
FIG. 6 is a perspective view of a press disc.

FIG. 5 shows another embodiment of the drive mechanism.

As shown in FIG. 5, at the upper portion of the left and right swing plates 28, 28, guide and support rollers 35, 35, 36 are rotatably supported on the front ends and the upper ends of the swing plates. By swinging both swing plates 28, 28 in a back and forth direction by the output shaft 34a of the cylinder 34, the receptacle plate 17 is supported and guided in vertical direction by the guide and support rollers 35, 35, 36 whereby the wheel receptacle 16 can be pivotable between a horizontal position and a rearwardly descending position.

As set forth above, with the device for removing the tire from the wheel, constructed as set force above, by mounting the wheel 3 with the tire on he working table 2 and inserting the positioning projection 22 into the center hole 3b of the wheel 3, the wheel 3 with the tire 4 can be accurately positioned at a predetermined position.

Subsequently, by lowering of the press mechanism 5, only upper side rim 3a of the wheel 3 is initially bent inwardly by the depressing projections 12 ... in a number of depressions corresponding to the number of depressing projection, and subsequently the remaining portion of the rim 3a is bent inwardly by the inner periphery of the tapered hole 11 so that the rim 3a can be bent into rounded configuration without forming any edge as shown in FIG. 7 to reduce the diameter.

In conjunction with reduction of the diameter of the rim 3a, the tire 4 is depressed by the lower surface 10a of the press disc 10 to become flat as shown in FIGS. 2 and 3. It is thus clear that the invention provides for flattening of the tire in synchronism with bending of the upper side rim 3a, and more specifically in unison therewith.

Subsequently, the wheel pushing out mechanism 6 is lowered to push the wheel 3 downwardly. Thus, the wheel is pushed out downwardly through the circular hole 2a of the working table 2 and released away from the tire 4. At the same time, the wheel receptacle 16 held at the horizontal position is descended rearwardly by the drive mechanism 25, and the wheel 3 dropped on the receptacle plate 17 is slipped down rearwardly of the device.

On the other hand, the tire 4 thus removed remains on the working table 2. Therefore, the tire can be taken out from the working table 2 by subsequently lifting up the press mechanism 5 and the pushing out mechanism 6. Although taking out of the tire 4 from the working table 2 is performed manually in the shown embodiment, it should be obvious to those skilled in the art to make this operation automatic.

In FIG. 1, 37 denotes a hydraulic unit connected to respective cylinders 7, 7, 13, 34 via pipings 38, 38', 39, 39', 40, 40', 41, 41'.

It should be noted that although the shown embodiment employs hydraulic cylinders 7, 7, 13, 34 as driving power source for the press mechanism 5, the pushing out mechanism 6 and the drive mechanism 25, it is not essential to use the hydraulic cylinder but the invention can employ any appropriate actuators, such as motors or the like. When rotary type actuators are employed, it is obvious that crank mechanism (not shown) and/or cam mechanism (not shown) may be required for converting rotational torque into reciprocating force.

With the above-mentioned construction, the present invention can easily and efficiently remove the tire from the wheel by positioning the wheel with the tire on the working table and by lowering the press mechanism and the pushing out mechanism in order. Furthermore, since the removal of the tire from the wheel can be performed without requiring manual operation, efficiency in tire removing operation can be remarkably improved.

Also, since only portions of the upper rim of the wheel are initially bent inwardly by a plurality of depressing projections of the press disc in the press mechanism, these portions can be easily bent. Furthermore, since the remaining portion of the rim can be bent inwardly by the inner periphery of the tapered hole so that the rim can be bent into rounded configuration without forming any edge to reduce the diameter, removal of the tire can be easily and smoothly performed so as not to injure the tire, particularly the bead portion thereof, to permit re-cycling of the tire.

Although the invention has been illustrated and described with respect to the foregoing exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiments set but above but to include all possible embodiments which can be embodied within a scope encompassed by the features set out in the appended claims and equivalents thereof.

What is claimed is:

1. A device for removing a tire from a wheel comprising:
   a working table for positioning the wheel fitted with the tire; and
   a press mechanism arranged above said working table for vertical movement relative to said working table, and including a press disc having a sectionally truncated conical tapered hole with a plurality of rim depressing projections extending in an axial direction and arranged at predetermined intervals in circumferential direction on an inner periphery thereof, and means for vertically moving said press disc to enable removal of the wheel from the tire.

2. A device for removing a tire from a wheel as set forth in claim 1, wherein said working table is formed with a circular wheel dropping hole having a diameter slightly greater than the diameter of said wheel fitted with said tire.

3. A device for removing a tire from a wheel comprising:
   a working table for positioning the wheel fitted with the tire;
   a press mechanism arranged above said working table for vertical movement relative to said working table, and including a press disc having a sectionally truncated conical tapered hole with a plurality of rim depressing projections extending in an axial direction and arranged at predetermined intervals in circumferential direction on an inner periphery thereof, and means for vertically moving said press disc; and
   a wheel pushing out mechanism arranged about said working table and passing through a center portion of said tapered hole of said press disc for vertical movement.

4. A device for removing a tire from a wheel comprising:
   a working table for positioning the wheel fitted with the tire, said working table being formed with a circular wheel dropping hole having a diameter slightly greater than a diameter of said wheel fitted with said tire;
   a press mechanism arranged above said working table for vertical movement relative to said working table, and including a press disc having a sectionally truncated conical tapered hole with a plurality of rim depressing projections extending in an axial direction and arranged at predetermined intervals in circumferential direction on an inner periphery thereof, and means for vertically moving said press disc;
   a wheel pushing out mechanism arranged about said working table and passing through a center portion of said tapered hole of said press disc for vertical movement; and
   a wheel receptacle arranged below said circular wheel dropping hole and tiltable for descending rearwardly.

5. A device for removing a rubber tire from a metal wheel comprising:
   a base having a horizontally extending working surface, on which an assembly of said rubber tire and said metal wheel is positioned;
   first means provided above said base in alignment with said assembly positioned on said working surface and movable toward and away from said assembly, for inwardly bending a rim of said metal wheel;
   second means provided above said base in coaxial position with said first means and movable toward and away from said assembly, for holding said rubber tire in compressed position in cooperation with said working surface of said base in order to release a bead portion of tire from said rim of the wheel; and
   third means provided above said base in coaxial position with said first and second means and movable toward said assembly for pushing said metal wheel out of said tire.

6. A device for removing a rubber tire from a metal wheel as set froth in claim 5, which further comprises fourth means for ejecting said metal wheel removed from said tire out of the device.

7. A device for removing a rubber tire from a metal wheel as set forth in claim 6, wherein said base is formed with a hole at a position corresponding to said metal wheel of said assembly positioned on said working surface for transferring said metal wheel removed from said tire to said fourth means.

8. A device for removing a rubber tire from a metal wheel as set forth in claim 5, wherein said first means includes a first component initially acting on a proximal end of said rim for partially bending said rim inwardly and a second component subsequently acting on a remaining portion of said rim inwardly.

9. A device for removing a rubber tire from a metal wheel as set forth n claim 5, wherein said first and second means operate in synchronism with each other.

10. A device for removing a rubber tire from a metal wheel as set forth in claim 5, wherein said first and second means operate in unison.

* * * * *